July 16, 1935. F. G. HUNTLEY 2,008,073
RAKE
Filed April 17, 1934 2 Sheets-Sheet 2
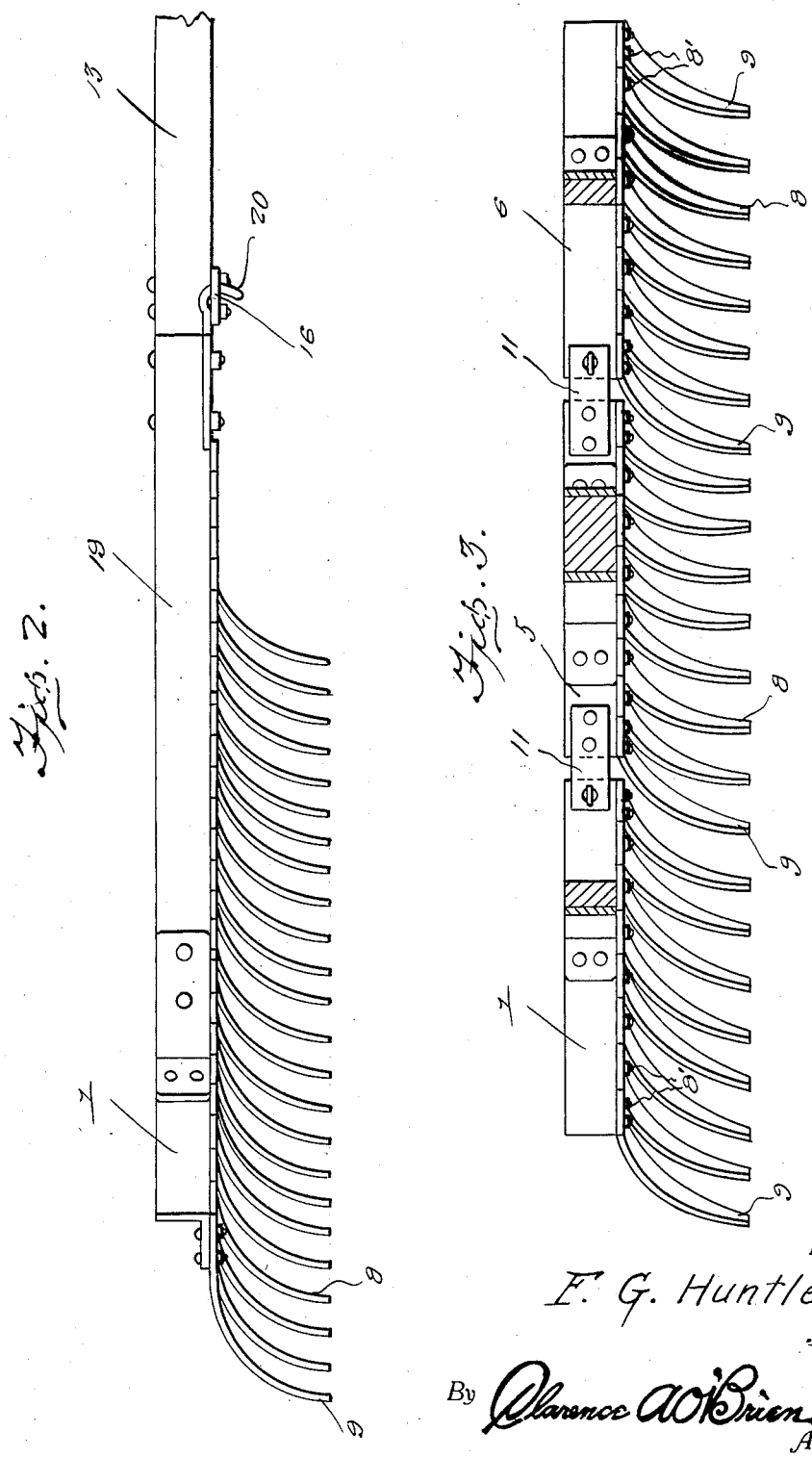
Inventor
F. G. Huntley
By Clarence A O'Brien
Attorney Patented July 16, 1935

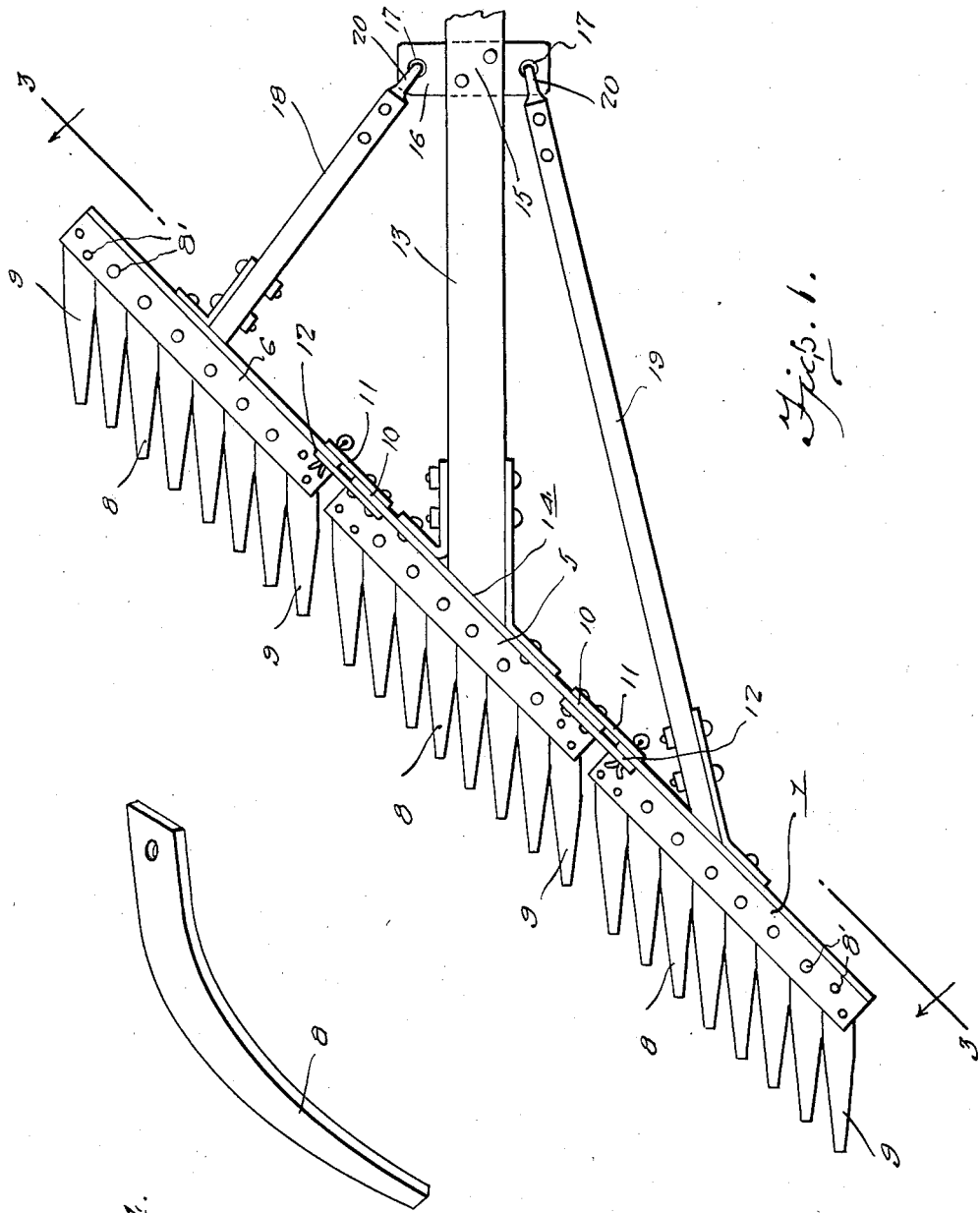

2,008,073

UNITED STATES PATENT OFFICE 2,008,073

RAKE

Fred G. Huntley, Marlow, N. H.

Application April 17, 1934, Serial No. 721,047

3 Claims. (Cl. 55—17)

My invention relates to an improvement in rakes, and in particular to rakes used to remove stones from the highway during the oiling of the same.

It is the practice at the present time when resurfacing a highway to cover the same with a coarse grade of sand and gravel, and to employ a large force of men to remove from the highway, so covered, the stones forming a part of the sand and gravel.

The principal object of my invention is to provide a rake which is adapted to be attached to the rear of a vehicle for the purpose of removing stones from a highway which is covered with coarse sand and gravel.

Another object of my invention is to provide a vehicle drawn rake which will readily adjust itself to the contour of the surface of the highway.

A still further object of my invention is to provide means whereby in the resurfacing of a highway the stones or coarse matter may be removed in a more expeditious manner than at present employed, thus effecting a great saving in labor and money in highway construction.

Other objects of the invention will be apparent from the following description of the present preferred form thereof, taken in connection with the accompanying drawings, wherein:

Figure 1 is a top plan view of the rake made in accordance with my invention.

Figure 2 is a side elevation of the rake.

Figure 3 is a sectional view taken on line 3—3 of Figure 1, and

Figure 4 is a view of the rake tooth detached from the frame of the rake.

In the drawings, wherein for the purpose of illustration is shown a preferred embodiment of my invention, a rake is illustrated having a head member composed of sections 5, 6 and 7. Each section is made of angle iron, and has attached to its underside, teeth 8 and 9, which are curved in configuration as clearly indicated in Figure 4. These teeth are secured to the underside of each section by bolts 8', the end teeth 9 of each section being individually secured by means of a pair of bolts in order to securely retain the intermediate teeth 8 in a fixed position. By the use of bolts, the teeth may be readily detached from the head of the rake either for the purpose of resharpening them, or for the purpose of replacing them when they become worn.

The end portions 10 of the section 5 of the head member have fixedly attached thereto retaining plates 11, which extend beyond the ends of said section 5, and which are pivotally and detachably connected at 12 to one end of each of the sections 6 and 7. It is evident by this construction that the sections 6 and 7 are adapted to pivot in a vertical plane, and thereby are capable of adjusting themselves to the various slopes of the sides of the road, while section 5 remains stationary relative to the adjoining sections by being drawn over the crown of the road.

To permit the stones or coarse material gathered by the teeth 8 and 9 to be deposited along the shoulder of the road or in the gutter thereof, the head of the rake is drawn diagonally along the road relative to the line of draft. To effect this purpose I provide a tongue 13 which is diagonally cut at its end 14, and secured to the outer side of section 5 of the head of the rake, as clearly shown in Figure 1. The free end 15 of the tongue is adapted to be attached to the rear of a vehicle. Intermediate the ends of the tongue 13 there is a cross plate 16, which extends across and beyond the width of the tongue. This cross plate has openings 17 therein, the purpose of which will be hereinafter explained.

Sections 6 and 7 have attached thereto braces 18 and 19 respectively, each end of which has a hook 20 which is adapted to fit loosely but securely in the openings 17 of the cross plate 16. These braces 18 and 19 differ in length, and thereby keep the head of the rake in a constant diagonal position relative to the tongue 13. While keeping the sections 6 and 7 in this constant diagonal position, the braces 18 and 19 permit, by means of the hook connection with the cross plate 16, the sections to freely pivot in a vertical plane, thereby allowing these end sections to adjust themselves to the various slopes of the sides of the road. It is apparent from the above description that the sections 6 and 7 may be easily detached from section 5 by removing the cotter pin from the retaining plates and the respective ends of the sections, and by removing the hook 20 from the openings 17 of the cross-plate 16.

In the use of the above described rake the end 15 of the tongue 13 is attached to the rear end of a vehicle which draws the rake over a road which has been covered with course sand and gravel. Section 5 of the head of the rake, being the central section, is drawn over the crown of the road, while the end sections 6 and 7, which are pivoted to section 5, are drawn along the sloping sides of the road because of their adaptability to adjust themselves to the varying slopes in the sides of the road. When the rake is being drawn over the gravel covered road, the head of the rake travels in a diagonal direction relative to the line of draft, thereby forcing the stones and coarse material caught by the teeth 8 and 9 toward the free end of section 7, whereupon the stones are deposited along the shoulder of the road or in the gutter thereof.

It is to be understood that the form of my invention herein shown and described is to be taken as a preferred embodiment of the same, and that various changes in the shape, size and arrangement of parts may be made, without departing from the spirit of my invention, or the scope of the appended claims.

Having thus described my invention, what I claim as new is:

1. A rake having central and side sections provided with tines, said side sections being detachably and pivotally connected to the central section whereby said side sections are adapted to pivot independently of each other in a vertical plane, a tongue attached to the central section and diagonally extending therefrom whereby the sections are drawn diagonally along the surface being raked relative to the line of draft of the rake, a cross plate intermediate the ends of the tongues, braces of different lengths extending from the side sections and detachably connected to the cross plate to maintain the diagonal relation between the rakes and the tongues while permitting the free movement of the side sections.

2. A rake having central and side sections normally in alinement with each other, said side sections being detachably and horizontally pivoted to the central section whereby the side sections are adapted to automatically and independently of each other adjust themselves to various slopes of the surface being raked, a tongue extending diagonally from the central section whereby the normally alined pivoted sections are drawn diagonally along its surface relative to the line of draft of the rake.

3. A rake having central and side sections in horizontal alinement with each other, said side sections being detachably and horizontally pivoted to the central section whereby the side sections are adapted to automatically and independently of each other adjust themselves to various slopes of the surface being raked, a tongue extending diagonally from the central section to permit the sections when being drawn over said surface, to force material toward one free end of the sections.

FRED G. HUNTLEY.